(12) United States Patent
Gavizon (10) Patent No.: US 12,448,135 B2
(45) Date of Patent: Oct. 21, 2025

(54) HYDROGEN-SOLAR INTEGRATED ENERGY SYSTEM AND METHOD FOR AIRCRAFT

(71) Applicant: Eric Gavizon, Aventura, FL (US)

(72) Inventor: Eric Gavizon, Aventura, FL (US)

(73) Assignee: HELIOS Aeronautics, Inc., Ann Arbor, MI (US)

( * ) Notice: Subject to any disclaimer, the term of this patent is extended or adjusted under 35 U.S.C. 154(b) by 0 days.

(21) Appl. No.: 18/936,958

(22) Filed: Nov. 4, 2024

(65) Prior Publication Data

US 2025/0162733 A1 May 22, 2025

Related U.S. Application Data (60) Provisional application No. 63/547,158, filed on Nov. 3, 2023.

(51) Int. Cl.

| | |
|---|---|
| *B64D 27/353* | (2024.01) |
| *B64C 29/00* | (2006.01) |
| *B64C 39/10* | (2006.01) |
| *B64D 27/34* | (2024.01) |
| *B64D 27/355* | (2024.01) |
| *B64D 27/357* | (2024.01) |
| *B64D 37/30* | (2006.01) |
| *B64U 10/25* | (2023.01) |

(Continued)

(52) U.S. Cl.
CPC ........ *B64D 27/353* (2024.01); *B64C 29/0033* (2013.01); *B64D 27/34* (2024.01); *B64D 27/355* (2024.01); *B64D 27/357* (2024.01); *B64D 37/30* (2013.01); *B64U 10/25* (2023.01); *B64U 50/19* (2023.01); *B64U 50/31* (2023.01); *B64U 50/32* (2023.01); *B64U 50/34* (2023.01); *B64C 2039/105* (2013.01); *H01M 2250/20* (2013.01)

(58) Field of Classification Search
CPC .............................. B64D 27/353; B64U 50/31
See application file for complete search history.

(56) References Cited

U.S. PATENT DOCUMENTS

| | | | |
|---|---|---|---|
| 4,341,607 A * | 7/1982 | Tison ................... | H01M 8/0656 204/229.4 |
| 10,875,626 B2 * | 12/2020 | Hefner ................... | B64U 70/80 |

(Continued)

*Primary Examiner* — Nicholas McFall
(74) *Attorney, Agent, or Firm* — Heed Law Group, PLLC; Thomas P. Heed (57) ABSTRACT

This patent discloses a powerplant for an aerial vehicle comprised of Perovskite-Silicon tandem photovoltaic solar cells covering the wings and fuselage, a lithium-sulfur battery, a high-pressure unitized regenerative proton exchange membrane ("PEM") device, and hydrogen tanks. The PEM device has a fuel-cell mode and an electrolysis mode. During level flight, the PEM device operates in fuel-cell mode, converting hydrogen into electricity. The electricity is used to run a plurality of pairs of permanent magnet synchronous motors, coupled to propellers, and mounted in a coaxial rotor configuration. During level flight, the array of solar cells re-charges the Li—S battery pack. During takeoff and landing, the Li—S battery pack supplements the electricity generated by the PEM device in fuel-cell mode. On the ground, the solar cells provides electricity to the PEM device, which operates in electrolysis mode, converting water into hydrogen gas, which is then stored in the hydrogen tanks.

26 Claims, 5 Drawing Sheets

(51) Int. Cl.
    *B64U 50/19*     (2023.01)
    *B64U 50/31*     (2023.01)
    *B64U 50/32*     (2023.01)
    *B64U 50/34*     (2023.01)

(56) References Cited

U.S. PATENT DOCUMENTS

| | | | |
|---|---|---|---|
| 11,046,426 B2 * | 6/2021 | Globerman | B64U 30/24 |
| 11,511,854 B2 * | 11/2022 | Baity | B64U 30/297 |
| 2016/0311529 A1 * | 10/2016 | Brotherton-Ratcliffe | B64C 29/0033 |

* cited by examiner

HYDROGEN-SOLAR INTEGRATED ENERGY SYSTEM AND METHOD FOR AIRCRAFT

CLAIM OF PRIORITY

This is a non-provisional application claiming priority to provisional patent application 63/547,158 filed Nov. 3, 2023, for a Hydrogen-Solar Integrated Energy System and Method for Aircraft. It is timely filed on Nov. 4, 2023 under 35 U.S.C. § 21(b).

FIELD OF INVENTION

This invention belongs to the classification for Aircraft; Aviation; Cosmonautics and to one or more subclassifications for Equipment for Fitting In or To Aircraft; Arrangements or Mounting of Power Plants or Propulsion Transmissions in Aircraft. Specifically, this invention is related to arrangements or mounting of hybrid electrical propulsion units or of plural diverse prime-movers for mutual or common propulsion in aircraft

BACKGROUND OF INVENTION

Modern aviation is remarkable in its ability to quickly move people and cargo about the World. The ubiquity of aviation has numbed the general public from many of its large drawbacks. Modern aviation is noisy, polluting, and expensive.

Electric planes are in development on many fronts because electric planes are theoretically quieter, cleaner, and cheaper. Electric planes have operational advantages, also. A traditional airplane engine powered by jet fuel is very complex, and the maintenance of jet engines is a significant part of the cost of operation. Electric motors are straightforward devices with fewer parts, potentially reducing maintenance costs. However, in practice, electric planes have still not delivered on their theoretical promise.

Unfortunately, to date, electric planes are unable to duplicate the reliability, range, and capacity of airliners using jet fuel. Electric planes use electricity to power an electric motor. The motor turns the electric power into mechanical energy. The electrical energy is typically stored in a battery. The capacity and weight of storage batteries is limiting to the electric plane concept.

Currently, lithium-ion batteries are used. These batteries provide a fraction of the energy per kilogram of jet fuel. Lithium-ion batteries are environmentally damaging, as they require materials that are primarily available through open-pit mining of cobalt. Lithium-ion batteries also have a notoriously high incident of autoignition, a failure-mode that is catastrophic in aerospace applications. The fire suppression systems used for Lithium-ion batteries in aerospace applications add to the weight, complexity, and cost of the overall electric plane concept.

There is a need in the market to provide a better storage and production system for electric energy in aircraft applications. Specifically, the market needs a storage and production system for electrical energy in aircraft that has a higher power output, lower weight, and easier packaging than what is currently available.

The present invention solves this problem with an integrated power plant for aviation that combines state-of-the-art solar cells with hydrogen fuel cells. The resulting power plant would provide significant improvements in range and capacity (the amount of cargo and people transported) when compared to current electric airplane applications.

SUMMARY

This summary is intended to disclose the present invention, a Hydrogen-Solar Integrated Energy System and Method for Aircraft. The embodiment and description are used to illustrate the invention and its utility and are not intended to limit the invention or its use. The following presents a simplified summary of the primary embodiment of the invention to provide a basic understanding of the invention. Additional concepts that can be added or varied with the presented embodiments that are disclosed. The present invention is novel with respect to the prior art, and can be distinguished from the prior art.

In view of the foregoing disadvantages inherent in the known types of aircraft propulsion systems, both electric and traditional jet-fueled, now present in the prior art, the present invention provides a new type of propulsion power plant that has all of the advantages and none of the disadvantages disclosed in the prior art.

The present invention discloses an innovative synergy of cutting-edge renewable energy technologies that are combined into a single aerospace propulsion system. The present invention is comprised of Perovskite-Silicon tandem photovoltaic solar cells ("Perovskite-Silicon Tandem Solar Cells"), a lithium sulfur ("Li—S") battery pack, a high-pressure unitized regenerative proton exchange membrane ("PEM") device, and hydrogen tanks. The PEM device has a fuel-cell mode and an electrolysis mode. An array of Perovskite-Silicon Tandem Solar Cells covers the fuselage and wings of an aerial vehicle. During level flight, the PEM device operates in fuel-cell mode, converting hydrogen into electricity. The electricity is used to run a plurality of co-axially mounted pairs of permanent magnet synchronous motors coupled to propellers. During level flight, the array of Perovskite-Silicon Tandem Solar Cells re-charges the Li—S battery pack. During takeoff and landing, the Li—S battery pack supplements the electricity generated by the PEM device in fuel-cell mode. On the ground, the array of Perovskite-Silicon Tandem Solar Cells provides electricity to the PEM device, which operates in electrolysis mode, converting water into hydrogen gas, which is then stored in the hydrogen tanks.

Hydrogen is three times as energy dense, pound for pound, as jet fuel, Hydrogen fuel cells do not create any greenhouse gases. The hydrogen fuel cells exhaust product is water. The aircraft will include an initial store of hydrogen in gas form and a reservoir to capture the water by-product. In an alternative embodiment, the present invention expels the water by-product.

In the preferred embodiment, the propulsion system is used with an unmanned aerial vehicle ("UAV") that has a nose, a fuselage, two front canards, and two wings with a leading edge. In an alternative embodiment, the wings may have winglet to improve stability. In one embodiment, the UAV has no clear dividing line between the wings and the fuselage. In other words, the UAV is a blended wing body ("BWB"). As used in this invention, a BWB allows more practical surface area with which to cover using an array of Perovskite-Silicon Tandem Solar Cells. The UAV also has the needed internal storage to house hydrogen tanks. The UAV airframe can be fabricated constructed using one or more of aluminum, aluminum alloy, aluminum and titanium, titanium, a titanium alloy, and a structural composite. The airframe can also be fabricated with carbon fiber joints, forged carbon fiber, carbon fiber reinforced structural polymers, nomex honeycombs, and polystyrene foam core structures wrapped in composites such as carbon fiber or poly-para-phenylene terephthalamid (AKA Kevlar®). The UAV body panels can be fabricated using one or more of carbon fiber, fiberglass, structural polymer composites, aluminum, aluminum alloy, aluminum and titanium, titanium, and a titanium alloy. The body panels can also be fabricated from 3-D printed structural polymers.

In an alternative embodiment, the invention will use titanium and aluminum in the space frame of the wings, to minimize weight while maximizing structural integrity.

In an alternative embodiment, the aerial vehicle would use a toroidal propeller to reduce noise. This would be useful in stealth military and urban applications.

The overall system will use an energy management system containing a processor, called the master controller. The energy management system will track energy usage and energy generation in real-time. The energy management system will include navigation functionality so that the aerial vehicle flies in the sunshine to the maximum extent possible.

BRIEF DESCRIPTION OF THE DRAWINGS

The present invention is illustrated with 4 drawings on 5 sheets.

DETAILED DESCRIPTION OF THE DRAWINGS

The following descriptions are not meant to limit the invention, but rather to add to the summary of invention, and illustrate the present invention, a Hydrogen-Solar Integrated Energy System and Method for Aircraft. The present invention is illustrated with a variety of drawings showing the primary embodiments of the present invention.

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left are used to describe the accompanying figures. The terminology includes the words above specifically mentioned, derivatives thereof, and words of similar import.

Figure 1A:
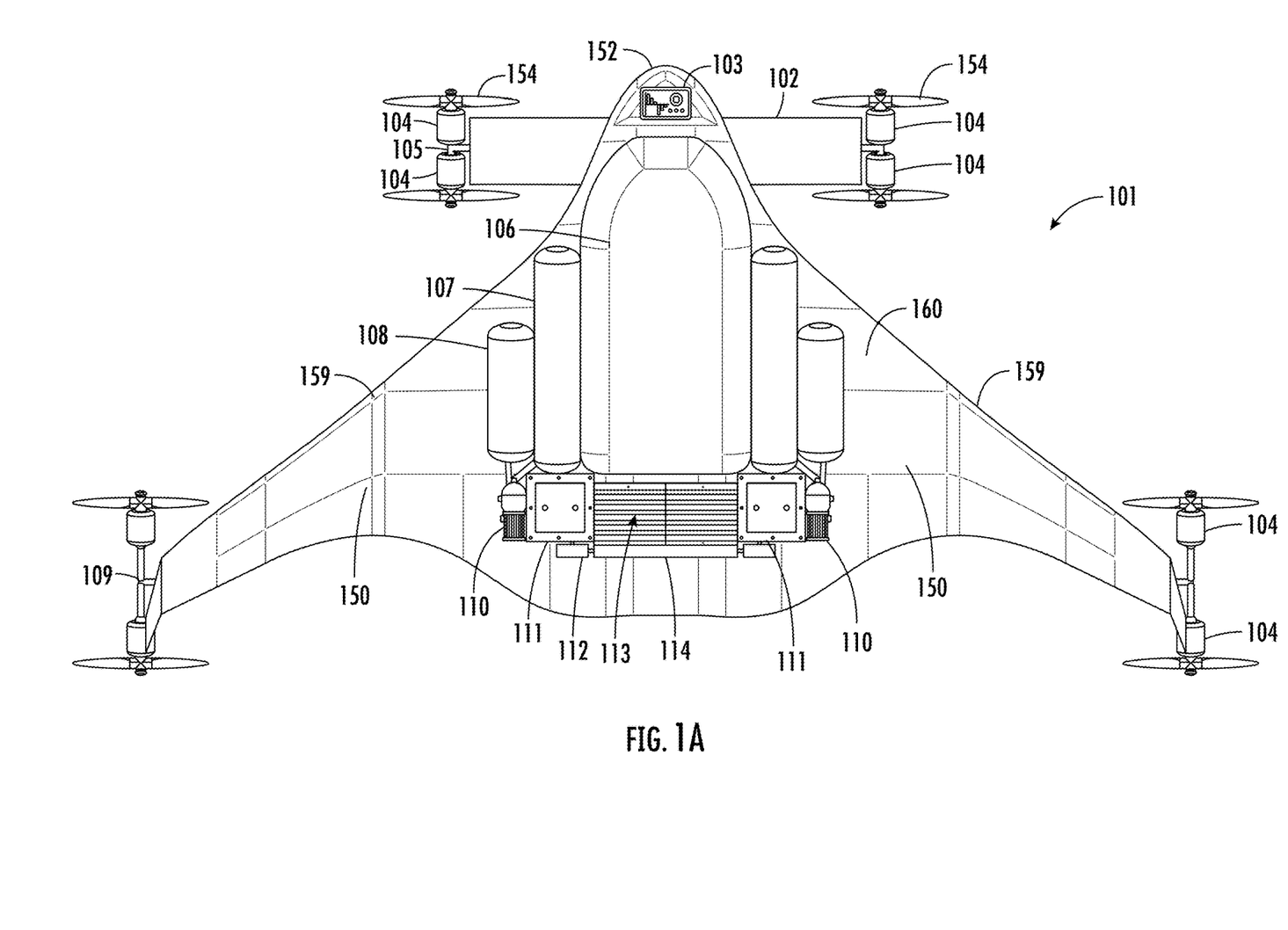
FIG. 1A is a top view of an unmanned aerial vehicle with its canopy removed, incorporating the present invention.

FIG. 1A is a top view of an unmanned aerial vehicle ("UAV") 101 with its canopy removed, in order to show various internal parts of the system and their topology within the UAV 101. As will be disclosed herein, the present invention covers the exterior of a UAV 101 in an array of Perovskite-Silicon tandem solar cell ("Tandem Solar Cells") 117 (in FIG. 1B). The Perovskite-Silicon tandem solar cells 117 generate electricity when exposed to sunlight.

Figure 1B:
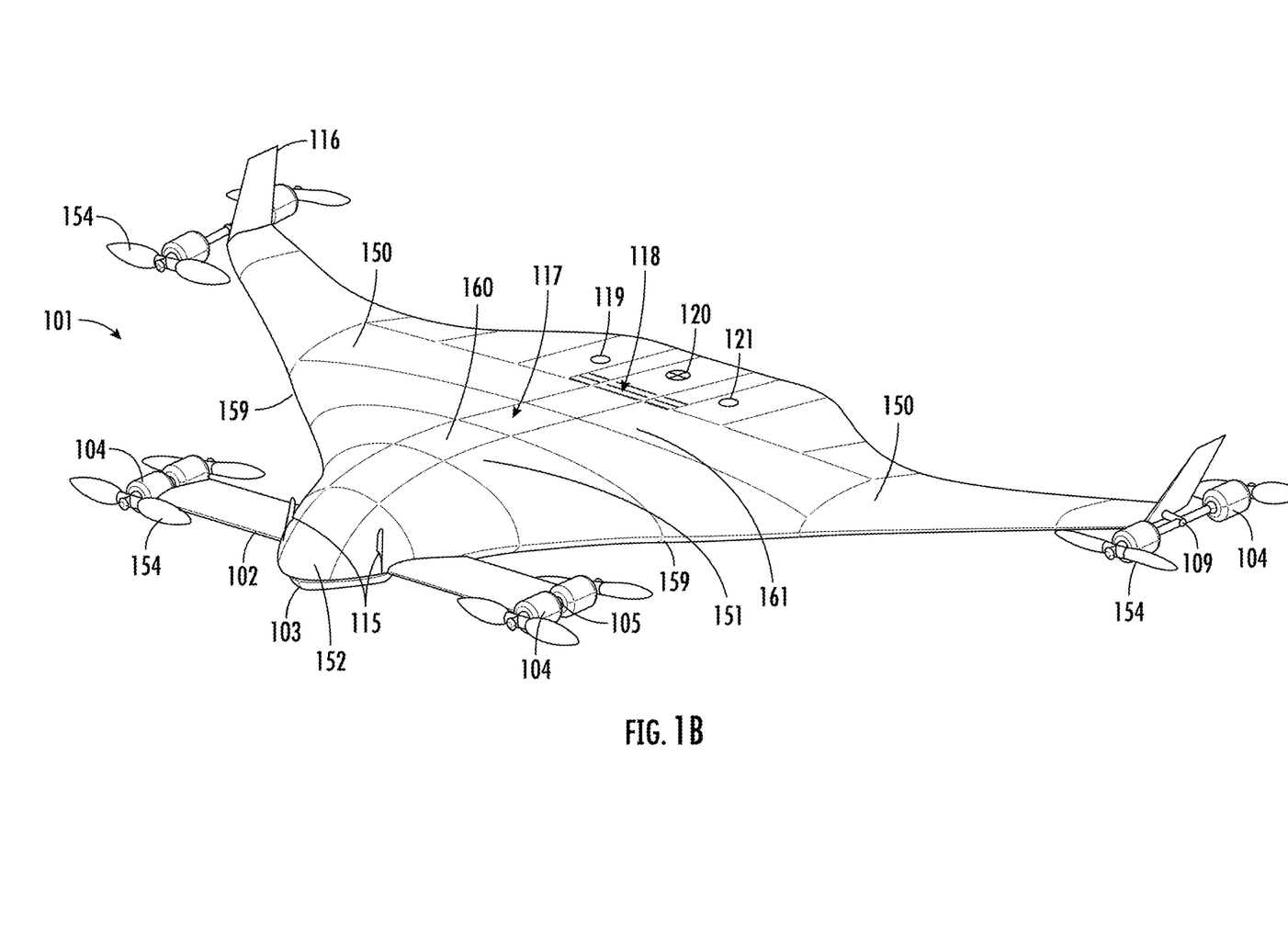
FIG. 1B is a front perspective view of an unmanned aircraft incorporating the present invention.
Figure 1C:
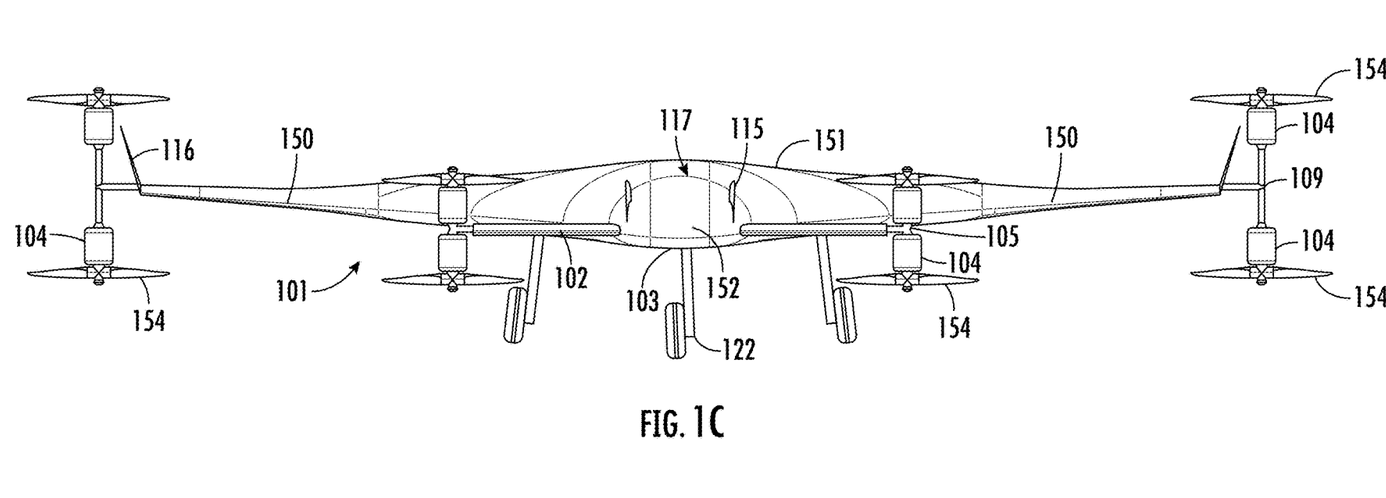
FIG. 1C is a front view of the an unmanned aircraft incorporating the present invention.

In the embodiment shown in FIGS. 1A-1C, the UAV 101 has a nose 152, a fuselage 151, two canards 102, and two wings 150, with each wing having a leading edge 159 and a winglet 116. The UAV 101 is a blended wing body ("BWB") 160. A BWB 160 is a fixed-wing aircraft 101 having no clear dividing line between the wings 150 and the fuselage 151. As used in this invention, a BWB allows more practical surface area with which to cover with an array of Perovskite-Silicon Tandem Solar Cells 117. The UAV 101 has an airframe largely constructed from aluminum and/or titanium with body panels largely fabricated from carbon fiber.

Referring now to FIG. 1B, in this view winglets 116 extending from the wings 150 are visible. The winglets 116 add stability to the BWB 160. BWB 160 aircraft often require such stabilization due to the lack of a tail. In one embodiment, the UAV 101 would be of modest size, 4-8 meters in length, which would minimize the need for stabilizing structures such as the winglets 116. Additionally, if the UAV 101 is operated at relatively low speeds, the need for stabilizing structures, such as the winglets 116, is also minimized.

The array of Perovskite-Silicon Tandem Solar Cell 117 are arranged on the upper surface of the fuselage 151, the canopy cover 161, the wings 150, and the canards 102 of the BWB 160. The Perovskite-Silicon Tandem Solar Cells provide energy to convert water into hydrogen onboard the UAV 101 without any reliance on infrastructure. The Perovskite-Silicon Tandem Solar Cells 117 also charge the Li—S batteries 114 (in FIG. 1A) during the cruising portion of flight.

Figure 4A:
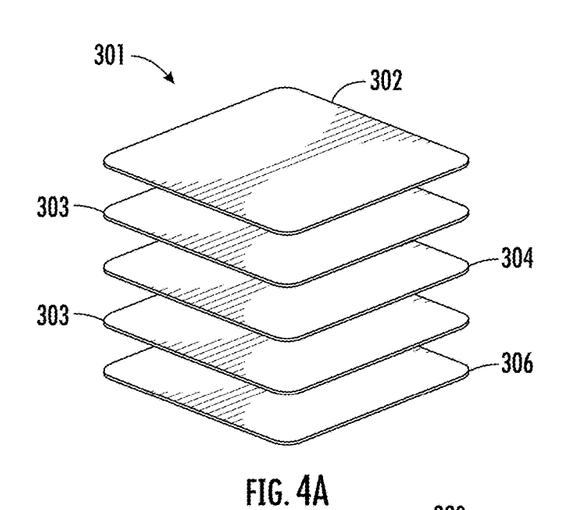
FIG. 4A shows a diagram of the layers of a silicon solar cell.
Figure 4B:
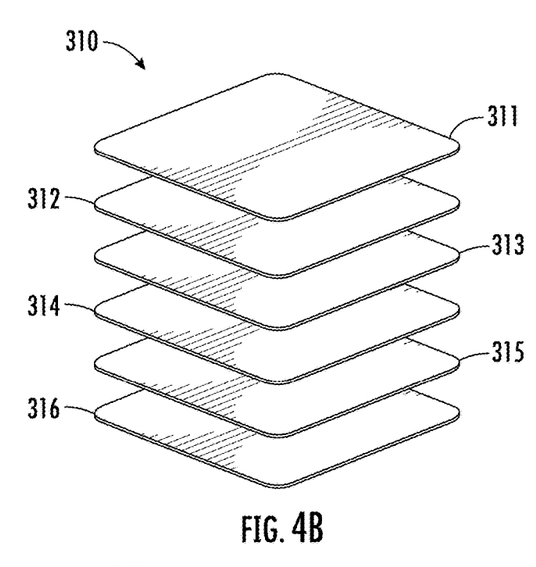
FIG. 4B shows a diagram of the layers of a perovskite solar cell.
Figure 4C:
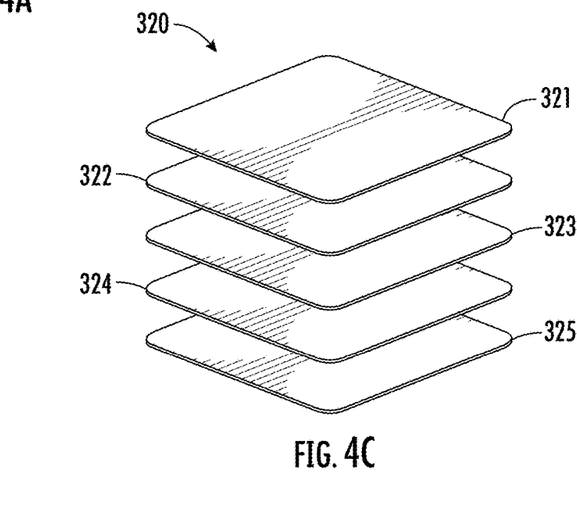
FIG. 4C shows a diagram of the layers of a Perovskite-Silicon Tandem solar cell.

FIG. 4A shows the layer stack-up of a typical silicon solar cell 301. FIG. 4B shows the layer stack-up of a typical Perovskite solar cell 310. FIG. 4C shows the layer stack-up of a representative Perovskite-Silicon Tandem Solar Cell 320. The silicon solar cell 301 is comprised of front electrode grid 302, an anti-reflection coating 303, a thin n-type silicon layer 304, a thin p-type silicon layer 305, and a back surface electrode 306.

The Perovskite solar cell 310 is comprised of a metallized contact 311, an electron interface layer 312, Perovskite 313, a hole interface layer 314, a transparent conductive layer such as indium tin oxide ("ITO") 315, and glass 316.

The Tandem Solar Cell 320 is comprised of a front transparent electrode 321, a Perovskite solar cell 310, a tunnel junction 323, a silicon solar cell 301, and a back contact 325. The Perovskite-Silicon Tandem Solar Cells 320 are thin multi-junction cells that use several layers of light-absorbing polymers to convert a greater range of light into electricity. This means higher practical efficiency. This is critical for aerospace applications, as it allows for a greater quantity of energy to be produced at any one time for a given surface area.

The preferred embodiment for the Perovskite-Silicon Tandem Solar Cell 320 comprises an array of passivated emitter rear cell ("PERC") 4 terminal Perovskite-Silicon Tandem Solar Cell 117, as they currently provide the best balance between potential efficiency (43%) and reliability. To protect the Perovskite-Silicon Tandem Solar Cells 320, the arrays of PERC 4 terminal Perovskite-Silicon Tandem Solar Cells 117 are coated with an organosilicate glass micro lens layer. The organosilicate application improves performance and prevents damage to the Perovskite-Silicon Tandem Solar Cells 320, themselves.

Referring now to FIG. 1A, again, the front canards 102 produce additional lift and offer stabilization during flight. The front canards 102 also provide a structure on which to mount the permanent magnet synchronous motors 104 and propeller 154. A tilt rotor axis 105 passes through the front canard 109, allowing the permanent magnet synchronous motors 104 and propeller 154 to be rotated from a horizontal position to a vertical position, and vice versa.

The UAV 101 has an avionics 103 compartment containing a control panel, GPS navigation system hardware, a flight controller, an energy management system, and a telemetry board. The GPS hardware is comprised of a transceiver chipset, a gyro, a power source, and associated electronics arranged on a printed circuit board ("PCB"). The transceiver chipset allows the GPS navigation system to communicate with data sources using commercially available satellite communications. The avionics 103 is connected to redundant antennae 115 (shown in FIG. 1B) on the nose 152 of the UAV 101. The GPS navigation system tracks current weather data to stay under the sunlight by avoiding cloud systems. The UAV 101 is routed in sunshine, provided it does not unduly increase the flight duration. The avionics 103 autonomously pilot the UAV 101 and accurately track the expenditure of energy in the system to maintain optimal efficiency. A control panel 103 on top of the hardware allows ground-based operators to accurately assess the UAV's 101 performance after each flight.

The UAV 101 has a plurality of permanent magnet synchronous motors 104 in coaxial rotor configuration attached to fixed pitch propellers 154. During takeoff and landing, the Li—S batteries 114 power the permanent magnet synchronous motors 104. During sustained flight, the permanent magnet synchronous motors 104 are powered by fuel cells. The coaxial rotor configuration creates more thrust without the need for larger diameter propellers 154, allowing for a compact and powerful thrust system.

A front tilt rotor axis 105 connects to the front permanent magnet synchronous motors 104 off of the canard 102. Likewise, a rear tilt rotor axis 109 connects to the rear permanent magnet synchronous motors 104 off of the wing 150. One or more servo motors can rotate the front tilt rotor axis 105 and the rear tilt rotor axis 109, allowing for vertical take-off and landing ("VTOL").

Figure 2:
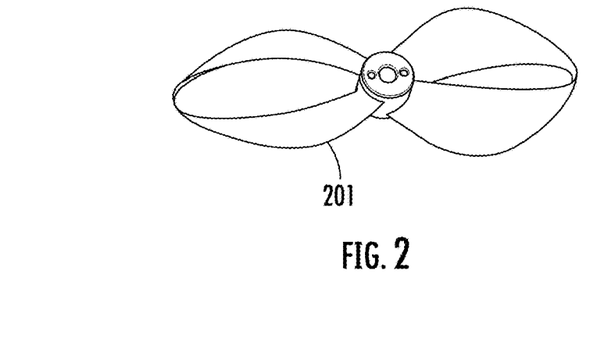
FIG. 2 is a top view of a propeller.

As shown in FIG. 2, in an alternative embodiment, the propellers may be variable pitch toroidal propellers 201. A variable pitch toroidal propeller 201 reduces noise and may be useful in military applications and in urban applications. The variable pitch toroidal propeller 201 is 40% quieter than a regular propeller 154. The trade-off is that a toroidal propeller 201 is about 10% less efficient than a regular propeller 154. This limits the application of the toroidal propeller 201 to situations where the noise improvement is worth the efficiency penalty.

As shown in FIG. 1A, the BWB 160 allows for an ample cargo area 106 in the fuselage 151. Like all aircraft, there is a weight limit for the cargo area 106 that depends on the distance travelled and the size of the UAV 101. Like many aircraft, internal balance sensors will guide the user in properly positioning cargo within the cargo area in order to maintain proper balance by positioning the cargo evenly about the UAV's 101 center of gravity.

The fuselage 151 contains two main pressurized hydrogen tanks 107 and two auxilliary hydrogen tanks 108. Both the main pressurized hydrogen tanks 107 and the auxilliary hydrogen tanks 108 are rated at 700 bar (7 Mpa) and are fabricated from pressure vessel gas cylinders overwrapped with a composite.

The main pressurized hydrogen tanks 107 and the auxilliary hydrogen tanks 108 are connected to a high-pressure unitized regenerative proton exchange membrane ("PEM") device 111 through a mechanical diaphragm compressor 110. The PEM device has two modes: a fuel cell mode and an electrolysis mode. In the electrolysis mode, the PEM device 111 converts water into hydrogen using electrical power from the Perovskite-Silicon Tandem Solar Cell array 117 during refueling. There are two PEM devices 111 for redundancy. An internal electrolyzer within the PEM device 111 generates hydrogen at high pressures—between 200-350 bar—within its electrolysis chamber.

This high pressure hydrogen is passed to a mechanical diaphragm compressor 110 in order to raise its pressure to 700 bar for storage in the hydrogen tanks 107, 108. There are two mechanical diaphragm compressors 110 for redundancy. The mechanical diaphragm compressors 110 have their own heat dissipation mechanisms to prevent overheating. For example, they are exhausted outside of the UAV 101. There is a release valve attached to the fitting between the tanks and the compressors to allow for an emergency shut off process if there is a malfunction, where hydrogen can be safely released to the environment depressurizing the hydrogen tanks 107, 108.

The water to hydrogen conversion system allows the present invention to fulfill an unmet need in off-grid logistics operations where jet fuel is not always available, and there is no infrastructure to support solely hydrogen or electric aircraft. A de-ionized water polishing bed is incorporated on the top of the PEM device 111. A circulation pump draws within the PEM device 111 water from any clean source of freshwater nearby. The PEM device 111 then electrolyzes the water, separating it into hydrogen and oxygen.

After take-off, a built-in circulation pump within the PEM device 111 purges the cell stacks of water that is generated during the fuel cell's 111 redox reaction. The PEM device 111 then operates in its fuel-cell mode, using the hydrogen from the hydrogen tanks 107, 108 to create electric power for sustained flight. By combining the hydrogen generation and the fuel cell together in a single device 111, the PEM device 111 saves space and weight and enables the present invention.

A high-voltage step-up inverter and electronic speed controller 112 is positioned adjacent to the PEM device 111. Both the fuel cell of the PEM device 111 and the Li—S batteries 114 deliver high current but relatively low-voltage power. The high-voltage step-up inverter and electronic speed controller 112 inverts the voltage from the battery 114, which is used during take-off and landing, and steps it up. The high-voltage step-up inverter and electronic speed controller 112 inverts and steps-up the voltage from the fuel cell of the PEM device 111 during sustained flight. The permanent magnet synchronous motors 104 require high-voltage. These motors 104 are designed for high voltage in order to reduce weight and minimize thermal heating. High current motors would require thicker and heavier wire that tends to get hotter. This can lead to fatigue failure as the polyimide coating on the wire can be compromised during repeated heating cycles.

In order to provide thermal management, a liquid cooled radiator 113 is placed between the PEM devices 111 and on top of the Li—S batteries 114. As shown in FIG. 1B, a vent 118 allows the liquid cooled radiator 113 to dissipate heat.

The Li—S battery pack 114 is responsible for powering the aircraft during the energy intensive phases of flight, namely take-off and landing phases. Hydrogen fuel cells, like those contained in the PEM devices 111, are incapable of delivering bursts of high-powered electricity. Li—S batteries 114 are an upgrade with respect to lithium-ion batteries, as they are more affordable, environmentally friendly, and energy dense. Li—S batteries 114 hold over four times the energy per kilogram when compared to lithium-ion batteries. Li—S batteries 114 rely on sulfur, which is inexpensive and readily available. Li—S batteries 114 are not highly flammable and pose little risk of autoignition in an aerospace application. This is a key consideration in the electric aircraft.

The key limiting factor for Li—S batteries 114 is that they have inferior cyclability, meaning that they degrade rapidly during charge-discharge cycles due to rapid de-ionization of the sulfur. They are often rendered useless after half the number of charge-discharge cycles as lithium-ion batteries. This limitation can be managed and minimized in an aerospace application, as Li—S cells can be easily maintained, replaced, and recycled in a typical airplane maintenance cycle.

The Li—S battery pack 114 interoperates with the energy management system of the avionics 103. The energy management system manages the energy expenditure of the Li—S battery pack 114. The energy management system performs functions such as overcurrent protection, cell monitoring and balancing, charge control, demand management, state-of-charge determination, state-of-health determination, temperature sensing, a fail-safe/shut down function for the Li—S battery pack 114, data storage, and a watchdog (to insure that the cells are all on-line). All of these functions can typically be performed by a first computer readable, non-transitory instruction set stored on a first non-transitory memory in the avionics 103. A processor contained in the avionics 103 capable of accessing the memory and executing the instruction set performs the functions. The energy management system requires a current sensing circuit, a plurality of bidirectional solid state switches, and a local low voltage power supply, all of which are contained in the avionics 103. In an alternative embodiment, a purpose-build ASIC can incorporate the processor, memory element, current sensing circuit, local low voltage power supply, and plurality of bidirectional solid state switches.

In one embodiment of the present invention, the Li—S battery pack 114 contains an additive of structured 3D graphene to prevent sulfur deionization. This stabilizes the sulfur and extends the life of the Li—S battery pack 114. In another embodiment of the present invention, the Li—S battery pack 114 contains gamma sulfur, a monoclinic phase of sulfur, which can also extend the charge-discharge cycles of the Li—S battery pack 114.

In an alternative embodiment, the Li—S battery pack 114 would use nanostructured electrodes to maximize the energy density. In another alternative embodiment, the Li—S battery pack 114 would use graphene supercapacitors to provide peak power-on-demand during take-off.

FIG. 1A showed the UAV 101 with the canopy cover 161 removed. The canopy cover 161 is secured during flight. On the ground, the canopy cover 161 can be removed with hydraulics or a gear mechanism attached to an electric motor.

Referring to FIG. 1B, which shows the UAV 101 with the canopy cover 161 in place and secured, the exterior features of the UAV 101 can be examined. The UAV 101 is a BWB 160. The UAV 101 has a nose 152, a fuselage 151, two canards 102, two wings 150 with winglets 116. Each wing has a leading edge 159 to create lift. The UAV 101 has a plurality of coaxial-rotor mounted pairs permanent magnet synchronous motors 104, each with a propeller 154. Each pair of co-axial-rotor mounted permanent magnet synchronous motors 104 is attached to a tilt rotor axis 105, 109. The upper surface of the UAV 101 is covered in an array of PERC 4 terminal Perovskite-Silicon Tandem Solar Cell 117. The array of PERC 4 terminal Perovskite-Silicon Tandem Solar Cell 117 can be contoured during fabrication for aerospace applications in order to fit to the contours of the UAV 101 airframe.

The avionics 103 are stored in the nose 152 and are connected to redundant antennae 115.

Towards the rear of the UAV, there is a vent 118 that allows the liquid cooled radiator 113 to dissipate heat. There are two water intakes 119, 121 for the PEM device 111. In an alternative embodiment, an optional electric charging port 120 is added to allow for direct charging of the Li—S batteries 114 and to allow for hydrogen production through the PEM device 111 without using the electrical energy from the array of PERC 4 terminal Perovskite-Silicon Tandem Solar Cells 117.

FIG. 1C shows a front view of the UAV 101 with the landing gear 122 in the down configuration (i.e., in position for landing). The coaxial-rotor mounted permanent magnet synchronous motors 104 have been rotated to the vertical position using the tilt rotor axes 105, 109. With the coaxial-rotor mounted pairs of permanent magnet synchronous motors 104 in the vertical position, the UAV can perform VTOL. Also visible in this view are the two wings 150 with winglets 116, the fuselage 151, the front canard 102, the nose 152 containing the avionics 103, the antennae 115 connected to the avionics 103, and the array of the PERC 4 terminal Perovskite-Silicon Tandem Solar Cells 117.

Figure 3:
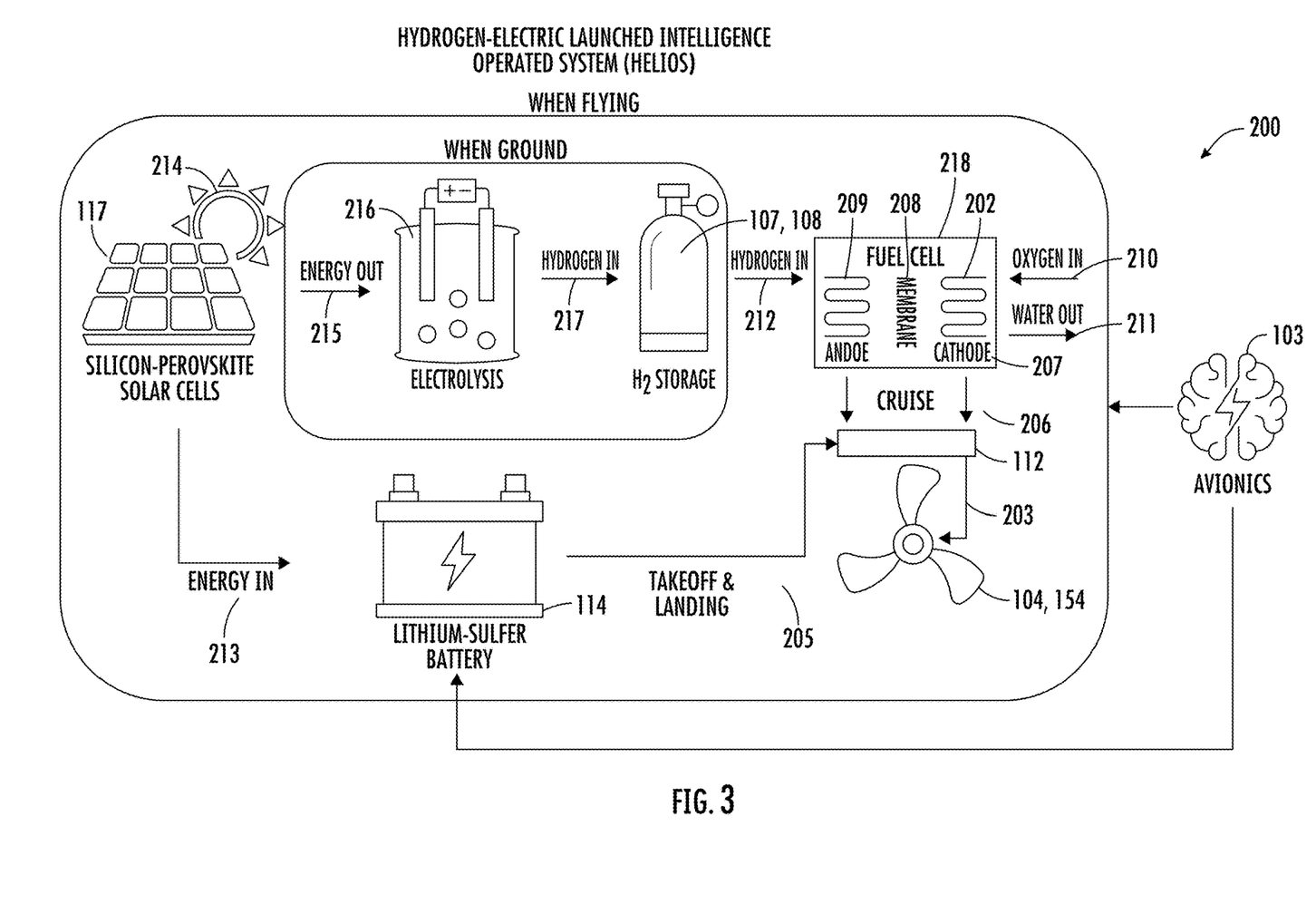
FIG. 3 is a system diagram showing the present invention, a propulsion unit.

FIG. 3 shows a system diagram of the energy flows of the present invention. When the UAV 101 is on the ground, solar energy from the sun 214 is converted into electricity by the array of PERC 4 terminal Perovskite-Silicon Tandem Solar Cells 117. The electricity 215 is used to run the PEM device 111 in electrolysis mode 216 to produce hydrogen 217 for storage in a hydrogen tank 107, 108.

During flight, the stored hydrogen 217 is removed first from the two main pressurized hydrogen tanks 107 and then the two auxilliary hydrogen tanks 108. The hydrogen is routed 212 into a fuel cell 218 having an anode 209, a membrane 208, and a cathode 202. The fuel cell 218 is contained within the PEM device 111. Oxygen 210 is added to the reaction with the waste product being water 211. The electrical output 206 of the fuel cell 218 is routed to the high-voltage step-up inverter and electronic speed controller 112, which steps up and inverts the voltage coming out of the fuel cell 218. The resulting voltage 203 drives the coaxial-rotor mounted permanent magnet synchronous motors 104 and propellers 154.

During flight, the output of the array of PERC 4 terminal Perovskite-Silicon Tandem Solar Cells 117 is used to recharge 213 the Li—S batteries 114.

During take-off and landing, the Li—S batteries 114 provides an electricity 205 boost needed to meet the energy demands of the coaxial-rotor mounted permanent magnet synchronous motors 104 and propellers 154. The electricity output 205 of the Li—S batteries 114 is routed to the high-voltage step-up inverter and electronic speed controller 112. The resulting voltage 203 drives the coaxial-rotor mounted permanent magnet synchronous motors 104 and propellers 154.

The avionics 103 has navigation and energy management capabilities. The avionics 103 controls the output of electricity from the PERC 4 terminal Perovskite-Silicon Tandem Solar Cell array 117 and the Li—S batteries 114.

I claim:

1. A propulsion system for aerospace applications comprised of an array of Perovskite-Silicon Tandem Solar Cells;
a lithium-sulfur ("Li—S") battery pack;
a unitized regenerative proton exchange membrane ("PEM") device, having a fuel-cell mode and an electrolysis mode;
a step-up inverter and electronic speed controller;
a plurality of hydrogen storage tanks containing hydrogen; and
a plurality of pairs of permanent magnet synchronous motors, each pair mounted in a coaxial rotor configuration, each permanent magnet synchronous motor having a propeller;
wherein the array of Perovskite-Silicon Tandem Solar Cells is comprised of an interconnected plurality of Perovskite-Silicon Tandem Solar Cells;
wherein, during level flight, the PEM device acts in its fuel cell mode, converting the hydrogen from the hydrogen tanks into electricity which is fed into the step-up inverter and electronic speed controller, which, in turn, feeds electricity to the plurality of pairs of permanent magnet synchronous motors mounted in a coaxial rotor configuration;
wherein, during take-off and landing, the Li—S battery pack supplements the electricity output of the fuel-cell-mode PEM device; and
wherein, while on the ground and in the sunshine, the array of passivated rear-cell ("PERC") 4 terminal Perovskite-Silicon Tandem Solar Cells provides electricity to the PEM device, which acts in its electrolysis mode and converts water and oxygen into hydrogen gas for storage in the hydrogen tanks.

2. The propulsion system for aerospace applications of claim 1, wherein each Perovskite-Silicon Tandem Solar Cell is comprised of a front transparent electrode, a Perovskite solar cell, a tunnel junction, a silicon solar cell, and a back contact.

3. The propulsion system for aerospace applications of claim 2, wherein the silicon solar cell within each of the Perovskite-Silicon Tandem Solar Cells is comprised of a front electrode grid, an anti-reflection coating, a n-type silicon layer, a p-type silicon layer, and a back surface electrode.

4. The propulsion system for aerospace applications of claim 3, wherein the Perovskite solar cell within each of the Perovskite-Silicon Tandem Solar Cells is comprised of metallized contact, an electron interface layer, Perovskite, a hole interface layer, a transparent conductive layer, and glass.

5. The propulsion system for aerospace applications of claim 4, wherein the transparent conductive layer is fabricated from indium tin oxide ("ITO").

6. The propulsion system for aerospace applications of claim 5, wherein the array of Perovskite-Silicon Tandem Solar Cells have passivated rear-cell ("PERC") 4 terminals.

7. The propulsion system for aerospace applications of claim 6, wherein the array of PERC 4 terminal Perovskite-Silicon Tandem Solar Cells is coated with an organosilicate glass micro lens layer.

8. The propulsion system for aerospace applications of claim 7, further comprising a a mechanical diaphragm compressor.

9. The propulsion system for aerospace applications of claim 8, wherein the hydrogen output from the PEM device acting in electrolysis mode is 200-350 bar; wherein the hydrogen tanks store hydrogen at 700 bar; and wherein the mechanical diaphragm compressor can raise the pressure of the hydrogen produced by the PEM device up to 700 bar.

10. The propulsion system for aerospace applications of claim 9, wherein, during level flight, the array of PERC 4 terminal Perovskite-Silicon Tandem Solar Cells re-charges the Li—S battery pack.

11. An unmanned aerial vehicle comprised of
a fuselage with a nose;
two wings;
landing gear;
a plurality of pairs of permanent magnet synchronous motors, mounted in a coaxial rotor configuration, each permanent magnet synchronous motor having a propeller;
an array of passivated rear-cell ("PERC") 4 terminal Perovskite-Silicon Tandem Solar Cells covering the fuselage and wings;
an lithium-sulfur ("Li—S") battery pack;
a proton exchange membrane ("PEM") device, having a fuel-cell mode and an electrolysis mode;
a step-up inverter and electronic speed controller; and
a plurality of hydrogen storage tanks containing hydrogen;
wherein the fuselage is sized so as to fit the plurality of hydrogen storage tanks;
wherein, during level flight, the PEM device acts in its fuel cell mode, converting the hydrogen from the hydrogen tanks into electricity which is fed into the step-up inverter and electronic speed controller, which, in turn, feeds electricity to the plurality of pairs of permanent magnet synchronous motors, mounted in a coaxial rotor configuration;
wherein, during take-off and landing, the Li—S battery pack supplements the electricity output of the fuel-cell-mode PEM device; and
wherein, while on the ground and in the sunshine, the array of PERC 4 terminal Perovskite-Silicon Tandem Solar Cells provides electricity to the PEM device, which acts in its electrolysis mode and converts water and oxygen into hydrogen gas for storage in the hydrogen tanks.

12. The unmanned aerial vehicle of claim 11, wherein no clear dividing line exists between the two wings and the fuselage, creating a blended wing body ("BWB").

13. The unmanned aerial vehicle of claim 12, further comprising two front canards.

14. The unmanned aerial vehicle of claim 12, wherein each of the two wings has a winglet.

15. The unmanned aerial vehicle of claim 12, wherein the fuselage and a portion of the two wings are covered by a removable canopy.

16. The unmanned aerial vehicle of claim 15, wherein the canopy is covered by the array of PERC 4 terminal Perovskite-Silicon Tandem Solar Cells.

17. The unmanned aerial vehicle of claim 16, further comprising an avionics package situated in the nose of the fuselage.

18. The unmanned aerial vehicle of claim 17, wherein the avionics package is comprised of a control panel, GPS navigation system hardware, a flight controller, an energy management system, and a telemetry board.

19. The unmanned aerial vehicle of claim 18, wherein at least two antennae are mounted on the fuselage and are connected to the avionics package.

20. The unmanned aerial vehicle of claim 19, wherein the GPS navigation system hardware is comprised of a transceiver chipset, a gyro, a power source, and associated electronics arranged on a printed circuit board ("PCB").

21. The unmanned aerial vehicle of claim 20, wherein the transceiver chipset allows the GPS navigation system hardware to communicate with data sources using commercially available satellite communications.

22. The unmanned aerial vehicle of claim 21, wherein the propellers are fixed pitch.

23. The unmanned aerial vehicle of claim 21, wherein the propellers are variable pitch toroidal propellers.

24. The unmanned aerial vehicle of claim 21, wherein each pair of permanent magnet synchronous motors mounted in a coaxial rotor configuration are attached to a tilt rotor axis capable of rotating the pair of permanent magnet synchronous motors with propellers, mounted in coaxial rotor configuration, from a horizontal position to a vertical position.

25. The unmanned aerial vehicle of claim 23, wherein, when the propellers are rotated into a vertical position, vertical takeoff and landing are possible.

26. A method for providing hybrid power to an aerial vehicle comprising the steps of using a UAV with wings and a fuselage;

storing hydrogen in the UAV in hydrogen tanks;

feeding hydrogen to a fuel-cell to create electricity;

powering a plurality of pairs of permanent magnet synchronous motors attached to propellers and mounted in a coaxial rotor configuration;

supplementing the electricity of the fuel cell with electricity from a lithium-sulfur ("Li—S") battery pack during takeoff, landing, and other times of peak energy consumption;

recharging the Li—S battery pack with an array of passivated rear-cell ("PERC") 4 terminal Perovskite-Silicon Tandem Solar Cells covering the fuselage and wings; and replenishing, while on the ground, the hydrogen by using the electricity from the array of PERC 4 terminal Perovskite-Silicon Tandem Solar Cells covering the fuselage and wings to power an electrolysis process capable of making hydrogen.

* * * * *